United States Patent
Gandhi et al.

(10) Patent No.: US 10,434,973 B2
(45) Date of Patent: Oct. 8, 2019

(54) AUTOMATICALLY ADJUSTABLE AIRBAG SYSTEM

(71) Applicant: Toyota Motor Engineering & Manufacturing North America, Inc., Erlanger, KY (US)

(72) Inventors: Umesh N. Gandhi, Farmington Hills, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 143 days.

(21) Appl. No.: 15/440,039

(22) Filed: Feb. 23, 2017

(65) Prior Publication Data
US 2018/0201222 A1  Jul. 19, 2018

Related U.S. Application Data

(60) Provisional application No. 62/447,690, filed on Jan. 18, 2017.

(51) Int. Cl.
| | |
|---|---|
| *B60R 21/2338* | (2011.01) |
| *B60R 21/015* | (2006.01) |
| *B60R 21/0134* | (2006.01) |
| *B60R 21/231* | (2011.01) |

(52) U.S. Cl.
CPC ...... *B60R 21/2338* (2013.01); *B60R 21/0134* (2013.01); *B60R 21/01516* (2014.10); *B60R 21/01542* (2014.10); *B60R 21/231* (2013.01); *B60R 2021/23382* (2013.01)

(58) Field of Classification Search
CPC .............. B60R 21/2338; B60R 2021/23382
See application file for complete search history.

(56) References Cited

U.S. PATENT DOCUMENTS

| | | | |
|---|---|---|---|
| 6,945,559 B2 | 9/2005 | Kassman et al. | |
| 7,874,576 B2 | 1/2011 | Gandhi | |
| 7,967,098 B2 * | 6/2011 | Choi | B60R 21/36 180/274 |
| 9,566,936 B2 * | 2/2017 | Biller | B60R 21/04 |
| 2013/0138132 A1 | 5/2013 | Phee et al. | |
| 2017/0355340 A1 * | 12/2017 | Choi | B60R 21/16 |

FOREIGN PATENT DOCUMENTS

CN  103318120 A  9/2013

* cited by examiner

*Primary Examiner* — Faye M Fleming
(74) *Attorney, Agent, or Firm* — Christopher G. Darrow; Darrow Mustafa PC

(57) ABSTRACT

An adjustable airbag system for a vehicle includes an inflatable airbag and at least one tether formed from a shape memory material. The at least one tether has at least one portion thereof secured to the airbag. The at least one tether is structured to contract so as to control an inflated dimension of the airbag when the at least one tether is heated to a temperature above a transformation temperature of the shape memory material and also above a superelastic temperature range of the shape memory material, prior to airbag deployment.

17 Claims, 7 Drawing Sheets

AUTOMATICALLY ADJUSTABLE AIRBAG SYSTEM

CROSS REFERENCE TO RELATED APPLICATIONS

This application claims benefit of U.S. Provisional Application No. 62/447,690, filed on Jan. 18, 2017, which is herein incorporated by reference in its entirety.

TECHNICAL FIELD

The present invention relates to airbag systems and, more particularly, to airbag systems enabling the inflation parameters of an airbag to be varied according to a the requirements of a particular situation.

BACKGROUND

The introduction of autonomous or self-driving vehicles may free vehicle occupants from driving tasks, and may permit the occupant greater freedom to change positions and/or orientation within a seat and within the vehicle. For example, the driver (or passenger) may be leaning forward in a seat. However, many vehicle occupant protection systems may be designed primarily to help restrain or cushion an occupant when the occupant is positioned in a predetermined location or has a predetermined orientation (for example, facing toward the front) within the vehicle. Such occupant protection systems may be less effective if the occupant's position and/or orientation deviates from the predetermined coverage parameters of the protection system.

SUMMARY

In one aspect of the embodiments described herein, an adjustable airbag system for a vehicle is provided. The system includes an inflatable airbag and at least one tether formed from a shape memory material. The at least one tether has at least one portion thereof secured to the airbag. The at least one tether is structured to contract so as to control an inflated dimension of the airbag when the at least one tether is heated to a temperature above a transformation temperature of the shape memory material and also above a superelastic temperature range of the shape memory material, prior to airbag deployment.

In another aspect of the embodiments described herein, an adjustable airbag system for a vehicle is provided. The system includes an inflatable airbag and at least one tether having at least one portion thereof secured to the airbag. The at least one tether is formed from a shape memory material and is structured to restrict expansion of the airbag into a vehicle passenger compartment during deployment of the airbag when the at least one tether is heated to a temperature above a transformation temperature of the shape memory material and also above a superelastic temperature range of the material, prior to airbag deployment.

DETAILED DESCRIPTION

Embodiments described herein relate to an adjustable airbag system for a vehicle. The adjustable airbag system includes an inflatable airbag and at least one tether formed from a shape memory material. The at least one tether has at least one portion thereof secured to the airbag. The at least one tether may be structured to contract so as to control an inflated dimension of the airbag when the at least one tether is heated to a temperature above a transformation temperature of the shape memory material and also above a superelastic temperature range of the shape memory material, prior to airbag deployment. The at least one tether may also be structured to stretch superelastically during deployment of the airbag when the tether is heated to a temperature above a transformation temperature of the shape memory material and also within a superelastic temperature range of the shape memory material, prior to airbag deployment. Superelastic stretching of the tether enables the inflated airbag dimensions to be controlled by another tether or by stitching or other structural features of the airbag.

Figure 1:
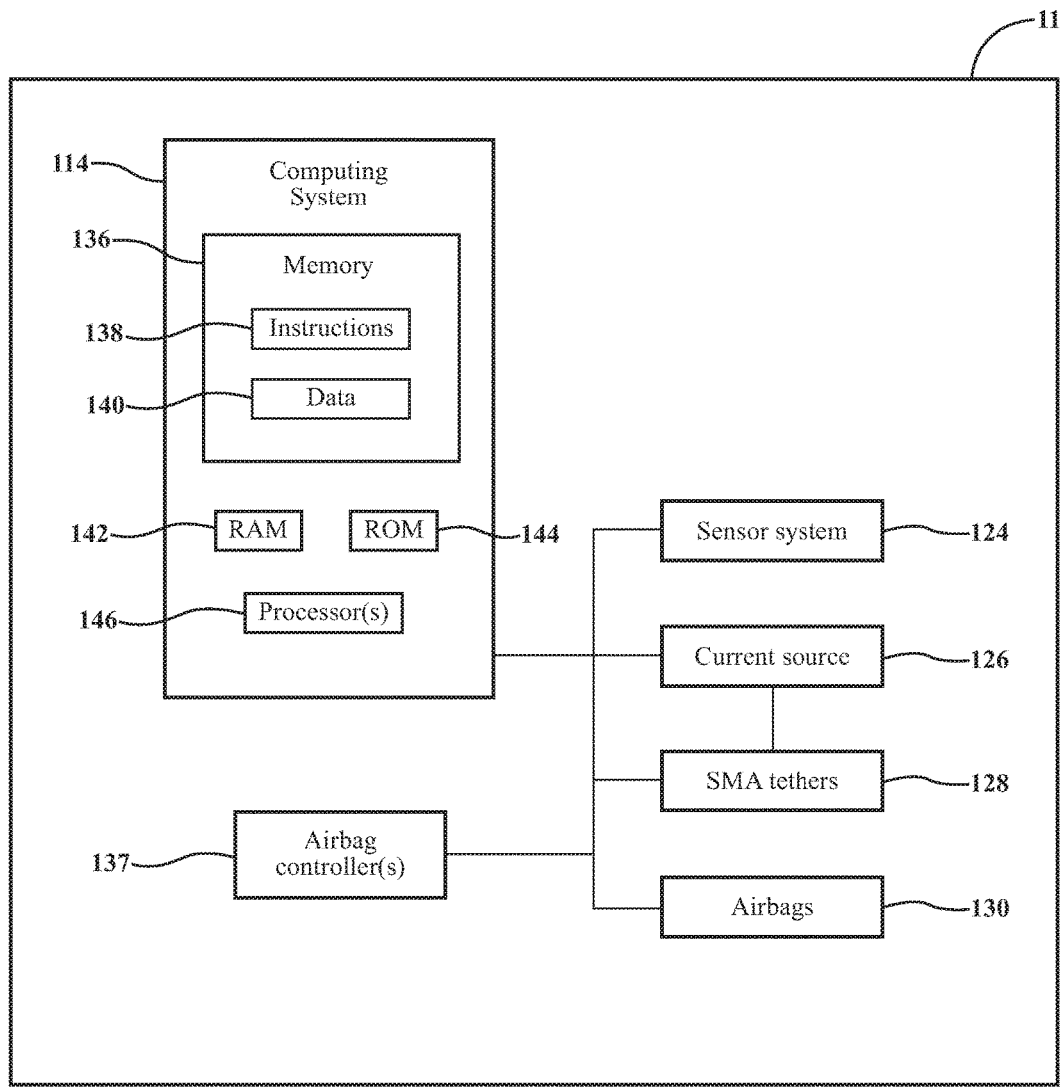
FIG. 1 is a functional block diagram illustrating a vehicle incorporating an adjustable airbag system in accordance with an example embodiment.

FIG. 1 is a functional block diagram illustrating an exemplary vehicle 11 incorporating an adjustable airbag system in accordance with an embodiment described herein. The vehicle 11 may take the form of a car, truck, or other vehicle. The vehicle 11 may be configured to operate fully or partially in an autonomous mode. In an autonomous mode, the vehicle 11 may be configured to operate without human interaction. For example, currents supplied to airbag tethers formed from shape memory materials as described herein may be controlled automatically to heat the tethers to temperatures needed to provide desired effects of the shape memory materials.

The vehicle 11 may include various systems, subsystems and components in operative communication with each other, such as a sensor system or array 124, a computing system 114, an adjustable airbag system, and other systems and components needed for operating the vehicle as described herein. The vehicle 11 may include more or fewer systems and each system could include multiple elements. Further, each of the systems and elements of vehicle 11 could be interconnected. Thus, one or more of the described functions of the vehicle 11 may be divided up into additional functional or physical components or combined into fewer functional or physical components. In some further examples, additional functional and physical components may be added to the examples illustrated by FIG. 1.

The computing system 114 may be operatively connected to the other vehicle systems and elements and may be configured so as to control and operate the vehicle 11 and its components as described herein. The computing system 14 may be configured to control at least some systems and/or components autonomously (without user input) and/or semi-autonomously (with some degree of user input). The computing system may also be configured to control and/or execute certain functions autonomously and/or semi-autonomously. The computing system 114 may additionally or alternatively include components other than those shown and described. The computing system 114 may control the functioning of the vehicle 11 based on inputs and/or information received from various sensors of the sensor system 124, and also based on other information.

FIG. 1 illustrates a block diagram of an exemplary computing system according to one or more illustrative embodiments of the disclosure. The computing system 114 may have some or all of the elements shown in FIG. 1. In addition, the computing system 114 may also include additional components as needed or desired for particular applications. The computing system 114 may also represent or be embodied in a plurality of controllers or computing devices that may process information and/or serve to control individual components or systems of the vehicle 11 in a distributed fashion.

The computing system 114 may include one or more processors 146 (which could include at least one microprocessor) for controlling overall operation of the computing system 114 and associated components, and which execute instructions stored in a non-transitory computer readable medium, such as the memory 136. "Processor" means any component or group of components that are configured to execute any of the processes and/or process steps described herein or any form of instructions to carry out such processes/process steps or cause such processes/process steps to be performed. The processor(s) 146 may be implemented with one or more general-purpose and/or one or more special-purpose processors. The processor(s) 146 can include at least one hardware circuit (e.g., an integrated circuit) configured to carry out instructions contained in program code. In arrangements in which there is a plurality of processors 146, such processors can work independently from each other or one or more processors can work in combination with each other. In one or more arrangements, the processor(s) 146 can be a main processor of the vehicle 11. For instance, the processor(s) 146 can be part of an electronic control unit (ECU) for the vehicle 11.

In some embodiments, the computing system 114 may include RAM 142, ROM 144, and/or any other suitable form of computer-readable memory. The memory 136 may comprise one or more computer-readable memories. A computer-readable storage or memory 136 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory 136 can be a component of the computing system 114, or the memory can be operatively connected to the computing system 114 for use thereby. The term "operatively connected," as used throughout this description, can include direct or indirect connections, including connections without direct physical contact.

The memory 136 may contain data 140 and/or instructions 138 (e.g., program logic) executable by the processor(s) 146 to execute various functions of the vehicle 11, as described herein. The memory 136 may contain additional instructions as well, including instructions to transmit data to, receive data from, interact with, or control one or more of the vehicle systems and/or components described herein (for example, components of the adjustable airbag system).

The vehicle 11 may include various types of airbags (generally designated 130) configured for vehicle occupant protection. These airbags may be positioned at any of a variety of locations within the vehicle, and may include front airbags (such as driver front airbag 22 as shown in the drawings), side curtain airbags, and any other desired type of airbag.

The vehicle may include an airbag controller 137 in operative communication with computing system 114, sensor system 124, and other elements of the vehicle as required. Airbag controller 137 may be configured to control operation of the various vehicle airbags responsive to information received from the sensor system 124, computing system 114, and other sources. In one or more arrangements, the airbag controller 137 or its functions may be incorporated into and performed by computing system 114. Alternatively, the airbag controller may be configured to control the current source 126 as described herein to control the temperatures of the various SMA tethers.

Vehicle sensor system 124 may be operatively connected with computing system 114 and other vehicle systems and components. In a known manner, the sensor system 124 may include sensors configured to provide data usable by the computing system 114 in formulating and executing suitable control commands for the various vehicle systems. In arrangements in which the sensor system 124 includes a plurality of sensors, the sensors can work independently from each other. Alternatively, two or more of the sensors can work in combination with each other.

Figure 1A:
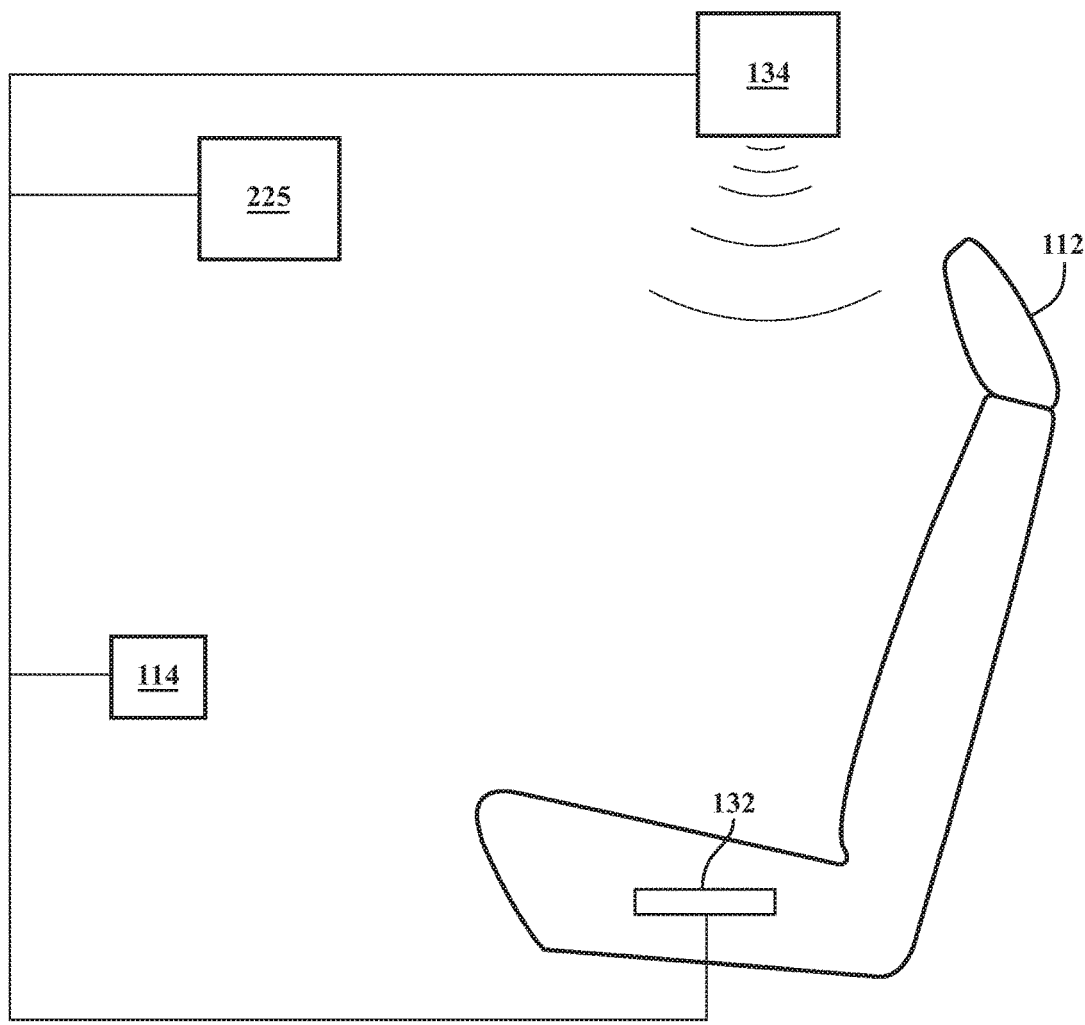
FIG. 1A is a schematic block diagram showing one embodiment of a sensor arrangement configured for measuring one or more vehicle occupant parameters.

Referring to FIG. 1A, sensor system 124 may include sensors operable to obtain data which may be used (by the pertinent sensors and/or in conjunction with computing system 114) to determine values for various vehicle occupant parameters relating to an occupant of the vehicle. The values of these parameters may be used to control operation of the various SMA tethers described herein. A vehicle occupant parameter may be a parameter relating to a vehicle occupant and which may affect a determination of a desired temperature of an SMA tether for a given situation. Examples of vehicle occupant parameters may include occupant weight, height, locations (and/or relative locations) of the occupant's head, torso, or other body portion, a direction in which the occupant is leaning, and other parameters. Because these parameters may change unpredictably and relatively rapidly, the sensors 124 and the computing system 114 may continuously gather and process data relating to the parameters, so that the vehicle occupant parameter values may be updated as rapidly as possible.

Types of sensors used may include weight (e.g., pressure) sensors (such as seat-mounted weight sensor 132), body portion positional sensors, and sensors for measuring other characteristics or conditions. Vehicle occupant parameters determined using the sensor data may be provided to the computing system or to a controller controlling current flow to the SMA tethers, for using in generating control signals for operation of the SMA tethers. The sensors 124 may provide signals representing vehicle occupant parameters to the computing system 114 and/or to a controller. For example, a seat-mounted weight sensor 132 as shown in FIG. 1A may send a signal representing the weight of an occupant of the vehicle to the computing system 114 or to a controller.

As another example, the vehicle 11 may also incorporate a height sensor 134. The height sensor 134 may send a signal to the computing system 114 or to a controller representing the height of an occupant of the vehicle. The height sensor 134 may be disposed in the ceiling of the vehicle or in another suitable location. This sensor may be, for example, an ultrasonic sensor, and may measure the position of the occupant's head or torso with respect to the sensor, and may also measure a direction of the occupant's head or torso with respect to the sensor. The height sensor 134 may send a signal to the computing system 114 representing the height of the occupant or the distance of a portion of the occupant's body from the sensor. Thus, overall size and shape of the airbag when deployed and/or the distance that an airbag projects into the passenger compartment when deployed may depend at least in part on the output of the height sensor 134.

The height sensor 134 may also assume different forms. As an example, the height sensor 134 may be a capacitive or laser sensor. Those skilled in the art may recognize many other possible embodiments in which one or more sensors are used to estimate the occupant's height. Other types of sensors may also be used, either alone or in combination.

The computing system 114 may also use information received from any combination of sensors in sensor system 124 and also information from any other source in determining whether the temperature of a given SMA tether should be adjusted for a particular set of potential deployment conditions. For example, the computing system 114 may combine information from the weight sensor 132 and the height sensor 134 in order to estimate the occupant's height. This may be desirable if the accuracy of the height sensor 134 is reduced due, for example, to its location in the vehicle. The computing system 114 may estimate the occupant's height based on, for example, a weighting of one sensor in favor of another (e.g., a weight of 75% for a height estimate based on the height sensor data, and a weight of 25% for the height estimate based on the weight sensor data (which may be calculated by assuming proportionality of height to weight)).

One or more cameras (generally designated 225) may be mounted in the passenger compartment. The cameras may be configured for detecting (or for providing information usable by the computing system 114 for determining) the position of an occupant (or the position of a particular portion of the body of an occupant) within the passenger compartment, an occupant orientation (for example, whether the occupant and/or the occupant's seat is facing to the right or left, or whether the occupant is reclined or seated upright in the seat), the occupant's height, and other parameters. For example, the cameras(s) may provide information enabling detection of a condition in which an occupant's head resides outside a predetermined zone or volume of space in relation to the seat. The computing system 114 may be configured to control the temperature of one or more SMA tethers based on whether the occupant's head resides within the predetermined zone. The cameras may also be configured to provide information (relating, for example, to the relative positions of the head and torso of the occupant) from which an orientation of the occupant may be estimated. For example, the camera data may be usable to determine in which direction the occupant is leaning while seated in the seat. Those skilled in the art may recognize that many different types and combinations of sensors may be used to estimate the occupant's weight, height, orientation and/or other vehicle occupant parameters.

Other embodiments may include additional sensors which may assist the computing system 114 in determining the occupant's weight and/or height. These sensors may be placed in or around the seat 112 and may allow the computing system 114 to more accurately determine the occupant's weight and/or height. For example, a sensor (not shown) may be placed in the seatback of the seat and used in conjunction with the weight sensor 132 in order to determine the occupant's weight. Any additional sensor or sensors may be in electrical communication with the computing system 114, and may send signals to the computing system, generally representing a vehicle occupant parameter, such as a pressure exerted by an occupant on the seat 112. The computing system 114 may use a combination of signals from a variety of different sensors to estimate the occupant's weight, height, and/or other vehicle occupant parameters.

Sensor system 124 may also include one or more pre-collision or pre-crash sensors configured to alert the computing system 114 to vehicle external conditions which indicate that a collision is imminent or probable. The pre-collision sensor(s) may include radar-based sensors, laser-based sensors, cameras, or any other suitable sensors.

In certain embodiments, one or of sensors 124 may incorporate a level of data processing capability as well as data gathering capability. This may enable the sensor to process data gathered by the sensor to determine a value or state of a vehicle occupant parameter. In cases where the parameter value may represent a trigger condition for controlling the temperature of one or more SMA tethers, the detection of the condition may be passed to the computing system 114 or to a suitable controller. The computing system 114 or a controller may then generate and transmit a suitable command for controlling the temperature of the one or more SMA tethers. In other embodiments, the sensor may gather data and pass the data to the computing system 114 or to a controller for analysis and interpretation.

FIGS. 2A-6 are schematic views showing various embodiments of airbag and tether arrangements which may be incorporated into an adjustable airbag system for a vehicle, in accordance with an embodiment described herein. The adjustable airbag system may include at least one inflatable airbag and one or more SMA tethers having at least one portion thereof secured to the airbag. The airbag may be a side curtain airbag, a driver or passenger side front airbag, or any other type of airbag. The airbag system may also include a current source 126 configured for supplying current to heat the SMA tethers. The airbag system may also include other systems or elements, depending on the requirements of a particular system design.

At least one of the tethers secured to an airbag may be formed from a shape memory (SMA) material, thereby providing an SMA tether. The SMA tether(s) may be structured for activation prior to airbag deployment, so as to restrict an inflated dimension of the airbag when the airbag is deployed. The SMA tether(s) may alternatively and/or additionally be structured for activation prior to airbag deployment so as to restrict expansion of the airbag into a vehicle passenger compartment during inflation of the airbag. In one or more arrangements, an SMA tether may be in the form of a straight wire having dimensions and a composition designed to provide the best balance of performance at superelastic temperatures and an ability to contract to an original dimension upon heating to a temperature above the transformation temperature of the shape memory material and also above the superelastic temperature range of the material.

The shape, dimensions, and other particulars of any given SMA tether may be determined in accordance with the requirements of a particular application. For example, the SMA tether may be capable of contracting when heated so as to restrict an associated inflated dimension of the airbag as desired. Also, the SMA tether shape, materials and other parameters may be selected so as to enable the airbag to be folded and packaged in a manner that will not interfere with contraction or other movement of the SMA tether during heating within the stowed airbag assembly, prior to airbag deployment. If desired, the SMA materials may be covered with an insulating material to electrically and/or thermally isolate the SMA tether from other SMA tethers, from the airbag material, and/or from other elements of the airbag system.

The SMA material may exhibit known properties of shape memory materials, including thermal shape memory and superelasticity. As is known in the pertinent art, thermal shape memory is a phenomenon whereby an element formed from a shape memory material tends to return from a stretched condition to an original, unstretched condition when the element is heated to a temperature of at least a transformation temperature of the shape memory material. Superelasticity is a phenomenon whereby an element formed from a shape memory material exhibits enhanced elastic properties when the element is heated to a temperature above the transformation temperature of the shape memory material, and also within a superelastic temperature range of the material. The SMA materials used in the SMA tethers may include, without limitation, copper-zinc-aluminum-nickel alloys, copper-aluminum-nickel alloys, and nickel-titanium alloys. However, it will be understood that other SMA materials may be used for the actuators, including those known presently in the art and those yet to be developed. In one embodiment, a tether may comprise an alloy of nickel-titanium, such as Nitinol.

In one or more arrangements, an SMA tether may be configured to contract or shorten when heated, and may be configured and attached to an associated airbag so as to correspondingly reduce a pertinent inflated dimension of the airbag when the tether is heated. The SMA material may be heated to a temperature above the transformation temperature of the material and also above the superelastic temperature range of the material to cause contraction. In this case, in an SMA tether structured to contract when heated, the tether may shrink in length or otherwise contract to its original unstretched dimension. For example, an SMA tether in the form of a straight wire may decrease in length.

The original unstretched length of an SMA tether may be designed to provide the reduced airbag dimensions or expansion restriction, so that when the tether is heated to a temperature above a transformation temperature of the shape memory material and also above a superelastic temperature range of the material, a tether that has been stretched will decrease in length or otherwise contract to its original unstretched length. This reduction in the dimension of the SMA tether restricts expansion or movement of portion(s) of the airbag to which the SMA tether is attached, thereby preventing the airbag from achieving a full inflated volume of which it may otherwise be capable, and/or preventing expansion or movement of a tethered portion of the airbag into a portion of a vehicle passenger compartment where the airbag would otherwise expand.

The material may exhibit superelastic behavior. The original unstretched length of an SMA tether may be designed to permit superelastic stretching or expansion of the tether responsive to expansion forces exerted on the portions(s) of the airbag to which the tether is attached, when the tether is heated to a temperature above the transformation temperature of the shape memory material and within the superelastic temperature range of the material prior to airbag deployment. In this case, the SMA tether may be structured so as to have little or no effect on the final inflated dimensions or the deployed extent of the airbag. Depending on the SMA materials used, the wire dimensions, and other pertinent factors, the length of the tether may increase up to 10% as a result of airbag inflation forces, when the tether is heated to a temperature in the superelastic range of the material. In addition, the tether may be structured to still be able to return to its original undeflected length when subsequently heated to a temperature above the transformation temperature of the shape memory material and also above the superelastic temperature range of the material.

The amount by which the SMA tether will stretch or expand at superelastic temperatures may be limited by airbag and/or tether design to ensure that the tether does not stretch so far in the superelastic condition that it cannot return to its original unstretched configuration when heated to a temperature above the transformation temperature of the shape memory material and also above the superelastic temperature range of the material. The maximum inflated dimensions and extent of the airbag may be controlled by airbag structural features such as by airbag panel size, shape, and/or stitching, by the action of any other tethers attached to the airbag, and other factors When the SMA tether is heated to a temperature within the superelastic temperature range of the material to permit superelastic expansion or stretching. Thus, considerations such as the desire for a certain amount of contraction of the SMA tether and the need for the tether to be able to return from a stretched condition to its original unstretched condition when suitably heated may determine or affect various design parameters of the SMA tether, for example, the original unstretched length or the tether and the SMA material from which the tether is formed.

An inflated dimension of the airbag as controlled by the tether may be a dimension of the airbag in its final, inflated condition after deployment and prior to a vehicle occupant contacting the airbag. An inflated dimension of the airbag is "restricted" when it is reduced to a value that is less than it would be if the SMA tether was not employed.

A portion of an SMA tether (for example, an end of the tether) may be secured to the airbag using any suitable method. For example, a mechanical fastener or attachment may be attached to the airbag fabric using stitching, adhesives, etc. An end of the tether may then be attached to the fastener.

The adjustable airbag system may include a current source 126 operatively connected to computing system 114 and to the shape memory alloy (SMA) tethers (generally designated 128) coupled to the various vehicle airbags.

SMA tethers may be formed from shape memory materials as described herein. Current source 126 may be configured to provide current to the SMA tethers for heating the tethers as described herein. Current source 126 may be controllable by the computing system 114 to provide a separate current to each individual SMA tether, for controlling the temperature of each tether independently of the other tethers.

The computing system 114 may be configured to control current source 126 so as to provide a separate current to each individual SMA tether. The current to each tether may be tailored to the heating requirements of the given tether according to one or more vehicle occupant characteristics as determined by the sensor system 124 and computing system 114. In one or more alternative arrangements, the current source 126 may be controlled by a controller separate from computing system 114.

Figure 2A:
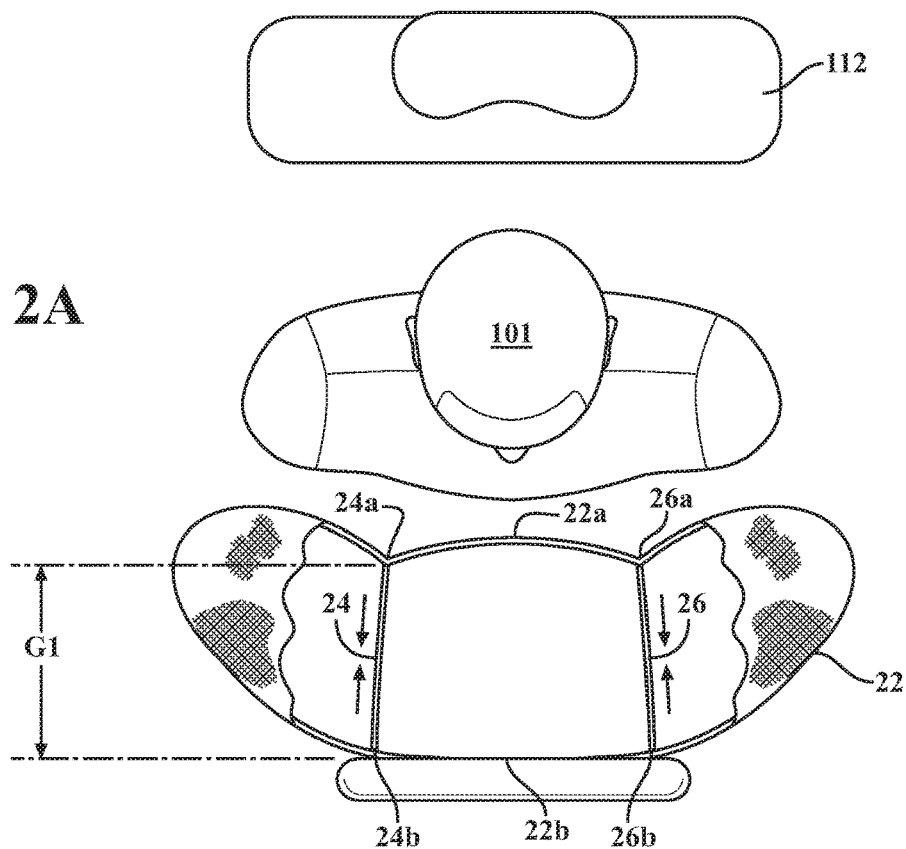
FIG. 2A is a schematic cross-sectional plan view of an airbag embodiment in a fully inflated condition in a first deployed mode.
Figure 2B:
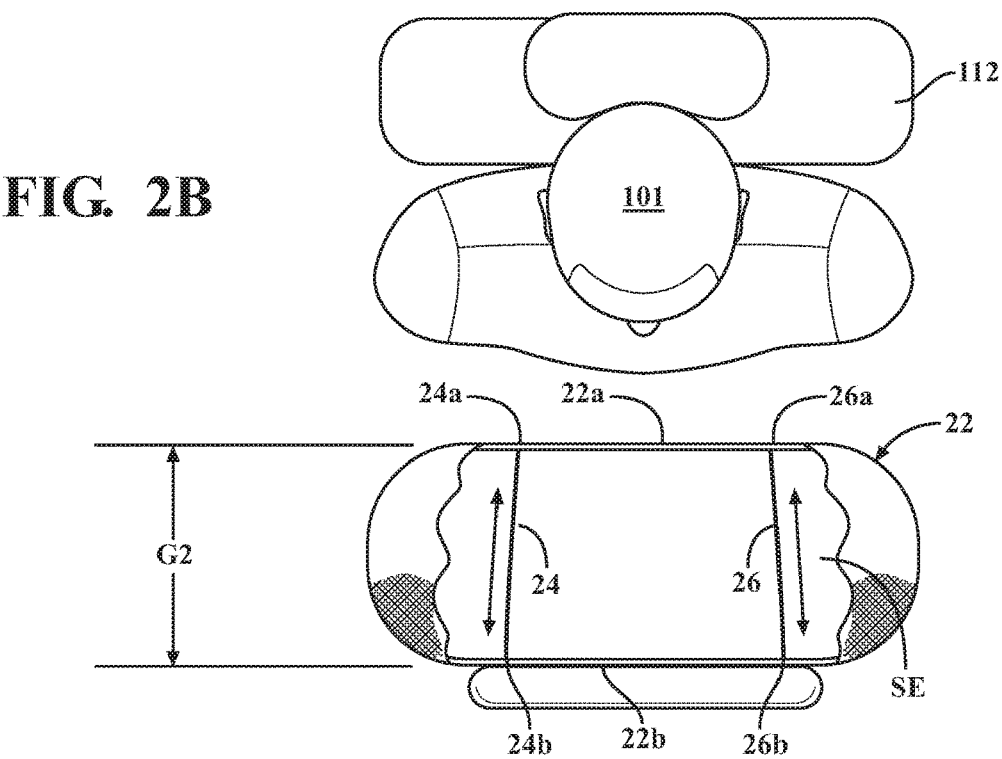
FIG. 2B is a schematic cross-sectional plan view of the airbag of FIG. 2A in a fully inflated condition in a second deployed mode.

FIGS. 2A and 2B show operation of one embodiment of an airbag 22 in an adjustable airbag system as described herein. FIGS. 2A and 2B each show a schematic cross-sectional plan view of an airbag 22 in a fully inflated condition. Airbag 22 incorporates a pair of SMA tethers 24 and 26. In FIGS. 2A and 2B, the tethers may be internal tethers, with each tether coupled to an associated first portion of the airbag and to an associated second portion of the airbag, and where each tether extends through an interior of the airbag to connect the first portion with the second portion.

In the embodiment shown in FIGS. 2A and 2B, a first end 24a of tether 24 and a first end 26a of tether 26 may be coupled to a first portion 22a of the airbag 22. The first portion 22a of the airbag may be a side or wall of the airbag designed to face and contact a seated occupant when the airbag is deployed. A second end 24b of tether 24 and a second end 26b of tether 26 may be coupled to a second portion 22b of the airbag 22. The second portion 22b of the airbag may be a wall or side of the airbag opposite the side 22a, or adjacent the side 22a.

The tethers 24 and 26 may be structured to control a spacing between airbag walls 22a and 22b when the tethers are heated. More particularly, the tethers 24 and 26 may be structured to shorten and decrease the distance between the airbag walls 22a and 22b to a value G1 when the tethers are heated to temperatures above the transformation temperatures of the shape memory material and also above the superelastic temperature ranges of the SMA material(s) from which the SMA tethers are formed.

In addition, the tethers 24 and 26 may be structured to exhibit superelastic behavior when heated to temperatures above the transformation temperature of the shape memory material, but within the superelastic temperature range of the material. Also, the airbag 22 and tethers 24 and 26 may be structured so that the maximum inflation dimensions of the airbag are determined by such elements as the bag stitching and panel configuration when the tethers are heated to temperatures above the transformation temperatures of the shape memory material, but within the superelastic temperature range of the material. The tethers 24 and 26 may be designed to stretch superelastically responsive to the pressures exerted on the airbag during inflation when suitably heated, and to permit the airbag to expand to inflation dimensions determined by the bag stitching and panel configuration. Thus, the SMA tethers 24 and 26 may be designed to have little or no effect on the airbag inflated dimensions when the SMA tethers are in the superelastic state. In this case, the airbag may inflate until the spacing between the walls 22a and 22b reaches a value G2 as shown in FIG. 2B, where G2>G1.

If, after heating the tethers to superelastic temperatures and prior to airbag deployment, a condition occurs where it would be desirable to restrict expansion of the airbag as shown in FIG. 2A rather than allowing the airbag to inflate freely as shown in FIG. 2B, the tethers 24 and 26 may be heated to temperatures above the transformation temperature(s) of their constituent shape memory material(s), and also above the superelastic temperature range(s) of the SMA material(s). This will cause the tethers 24 and 26 to shorten as previously described, so that if the airbag deploys when the tethers are shortened, the spacing between the airbag walls 22a and 22b will be restricted to the dimension G1. Each of SMA tethers 24 and 26 (and SMA tethers in other embodiments described herein) may be electrically coupled to a current source 126, such as current source 126 shown in FIG. 1.

In FIG. 2A, the tethers 24 and 26 are shown in either states where they have been heated to temperatures above the transformation temperature(s) of their constituent shape memory material(s), and also to temperatures above the superelastic temperature range(s) of the material(s) (resulting in contraction of the tethers), or otherwise in states where they have not yet been heated to superelastic temperatures. Control of the tether temperatures so as to produce the desired shape memory effects may be done prior to deployment of the airbag 22 and may be done as soon as a condition is detected responsive to which it is deemed desirable to modify an inflated dimension of the airbag. Control of the tether temperatures as soon as conditions favoring a change SMA behavior are detected helps enable the tethers to achieve a corresponding desired state of contraction or superelasticity prior to deployment of the airbag, so that the heated tethers have their desired effects on airbag inflation or movement when the airbag is deployed.

If the tethers 24 and 26 have not been heated prior to airbag deployment, or if the tethers were previously heated so as to shorten them to their normal, unstretched lengths, the tethers may be at their original, unstretched lengths and may operate to restrict the spacing between the airbag walls 22a and 22b when the airbag has been inflated. If the tethers 24 and 26 have been heated prior to airbag deployment, heating of the tethers to a temperature above a transformation temperature of the shape memory material and also above a superelastic temperature range of the material may produce a contraction or shortening of the tethers. This shortening of the tethers 24 and 26 prior to airbag deployment will result in the spacing between airbag walls 22a and 22b being controlled by restricting the dimension G to a value of G1.

In FIG. 2B, the tethers 24 and 26 are shown heated to temperatures above the transformation temperature(s) of their constituent shape memory material(s), and also to temperatures within the superelastic temperature range(s) of the material(s). Thus, during deployment and expansion of the airbag, airbag inflation forces act to stretch the tethers 24 and 26 in their superelastic states, until the airbag expansion is limited by the structure of the bag as fabricated (i.e., by the stitching, panels dimensions, and other structural characteristics of the airbag). In addition, the tether dimensions and material and also the maximum value of the inflated dimension of the airbag controlled by the tether may be specified so that the tether is not stretched past a point where it will not return to its original unstretched length when heated to a temperature above the transformation temperature of the shape memory material and also above a superelastic temperature range of the material.

Heating of the SMA tether(s) to achieve a desired effect upon airbag deployment may occur prior to deployment of the airbag. The SMA tether(s) may be heated responsive to the occurrence of any of a variety of conditions, as detected by vehicle sensors. For example, the SMA tether(s) may be heated responsive to an orientation of the vehicle occupant or a position of the vehicle occupant (or a portion of the occupant), as described herein with respect to FIGS. 2A and 2B. Also, the SMA tether(s) may be heated responsive to a size of the vehicle occupant. For example, the tethers may be heated to restrict one or more inflated dimensions of the airbag, thereby reducing the size of the airbag or a portion of the airbag, when sensors detect that the airbag is positioned so as to cushion a relatively smaller or lighter occupant, if the airbag is deployed. Alternatively, the tethers may be heated to permit the airbag to expand, when sensors detect that the airbag is positioned so as to cushion a relatively larger or heavier occupant, if the airbag is deployed.

For example, as shown in FIG. 2A, the tethers 24 and 26 may be heated so as to produce shortening of the tethers when sensors detect that a seated occupant 101 is positioned forwardly in the vehicle cockpit, or is spaced apart from the seat back 103. In this case, it may be desirable to restrict the inflated dimension of the airbag between walls 22a and 22b to a first value G1, so that the airbag does not contact the occupant 101 while the airbag is inflating.

In another example, as shown in FIG. 2B, the vehicle sensors 124 may detect that the torso of occupant 101 is in contact with the seat back 103. In this case, the computing system 14 may determine, based on the occupant's position, that the airbag will inflate to its normal, unrestricted dimensions prior to the occupant making contact with the airbag. Thus, the tethers 24 and 26 may be heated to a superelastic state so as to enable the tethers to stretch during inflation, thereby enabling the airbag to achieve its full inflated dimensions. In this case, the spacing between the walls 22a and 22b may expand to a dimension G2 greater than G1.

In another example, the vehicle sensors 124 may detect that the head of an occupant is located a certain distance forward of the sensor. From this location, the computing system 114 may determine that the occupant is leaning forward in the seat. Based on this assumption, the computing system may control the temperature(s) of one or more SMA tethers coupled to a front airbag (such as airbag 22 of FIGS. 2A and 2B) so as to restrict a deployed dimension of the airbag, and so as to reduce a risk of the airbag contacting the occupant's head and pushing it backwards during deployment.

In other scenarios, the tethers may be heated prior to airbag deployment responsive to an occupant's position within the vehicle passenger compartment, occupant orientation (for example, whether the occupant and/or the occupant's seat is facing to the right or left, or whether the occupant is reclined or seated upright in the seat), the occupant's weight, the occupant's height, and other parameters. For example, it may be desirable to restrict inflation of the airbag 22 as shown in FIG. 2A in cases where the occupant 101 has a relatively lower weight.

Figure 3A:
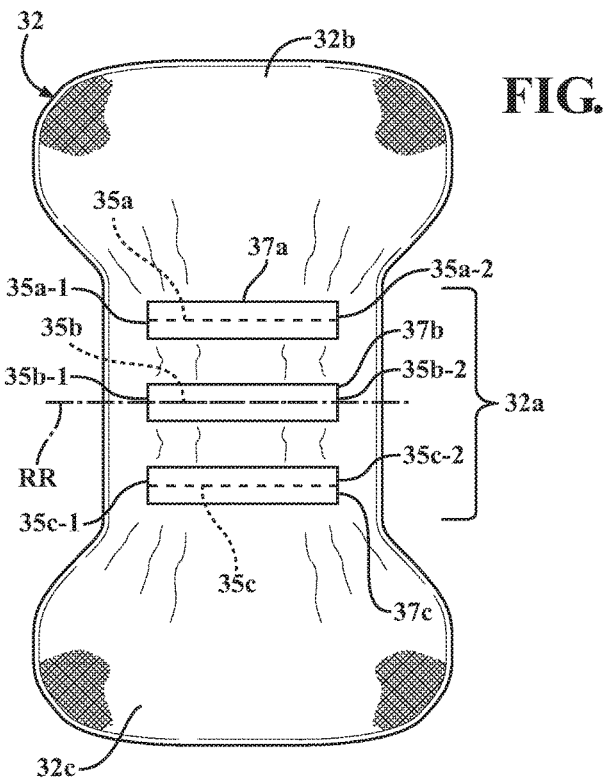
FIG. 3A is a schematic side view of another airbag embodiment in a fully inflated condition in a first deployed mode.

FIGS. 3A-3D show operation of another possible arrangement of SMA tethers coupled to an airbag so as to affect the inflated dimensions of the airbag when the tethers are heated. FIG. 3A is a schematic side view of an embodiment of an airbag 32 having multiple SMA tethers 35a-35c coupled to an exterior surface of the airbag. For example, each of the tethers 35a-35c may be in the form of a straight wire with the ends of each wire attached to a fixed location on an exterior surface of the airbag 32 using any suitable method. Tethers 35a-35c may have associated covers 37a-37c attached to the exterior surface of the airbag 32 to cover and protect the tethers.

The tethers 35a-35c may be structured to contract or shorten upon heating to temperatures above the transformation temperature(s) of their constituent shape memory material(s), and also to temperatures above the superelastic temperature range(s) of the SMA material(s). Heating of the tethers in this manner prior to deployment of the airbag may restrict inflation of the portions of the airbag attached to the tethers. In the embodiment shown, tethers 35a-35c are coupled to the airbag 32 along a central portion of the airbag.

In FIG. 3A, if the tethers 35a-35c have not been heated prior to airbag deployment, or if the tethers were previously heated so as to shorten them to their normal, unstretched lengths, the tethers may be at their original, unstretched lengths when the airbag is fully inflated, and may operate to restrict inflation of the central portion 32a of the airbag when the airbag is inflated. In this case, each of tethers 35a-35c may restrict expansion of a portion of the airbag circumference extending along a plane passing through the airbag and along which the tether extends (for example plane RR shown in FIG. 3A). In this case, the tethers 35a-35c combine to restrict a circumference of the airbag central portion 32a.

Figure 3B:
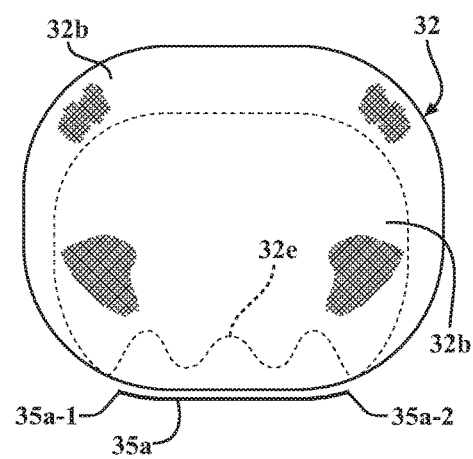
FIG. 3B is a schematic plan view of the airbag embodiment of FIG. 3A.

Also, the unrestricted upper portion 32b and lower portion 32c of the airbag may inflate freely to the structural limits of the airbag. FIG. 3B shows a schematic plan view of the inflated airbag shown in FIG. 3A. 32e is a part of the airbag central portion 32a attached to ends of a representative tether (for example, tether 35a) at locations 35a-1 and 35a-2, and showing an unexpanded portion of the airbag between the tether attachment locations 35a-1 and 35a-2. It may be seen from FIGS. 3A and 3B that the tethers 35a-35c restrict expansion of the portions of the airbag to which they are attached when the tethers are heated to temperatures above the transformation temperature(s) of their constituent shape memory material(s), and also to temperatures above the superelastic temperature range(s) of the SMA material(s).

Figure 3C:
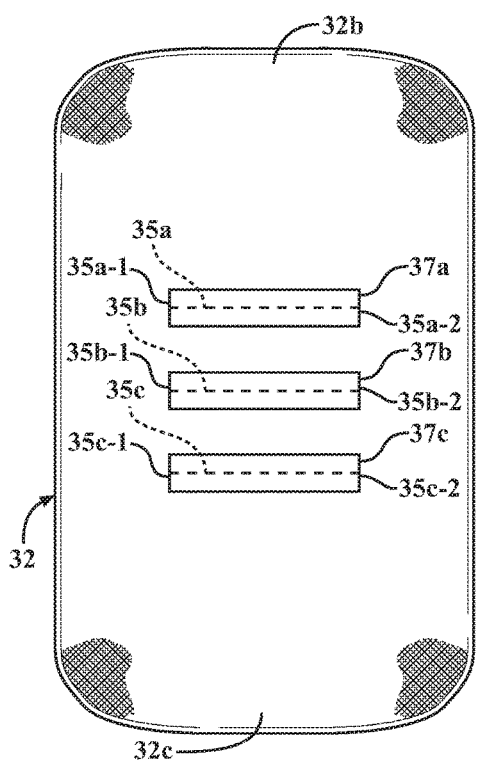
FIG. 3C is a schematic side view of the airbag embodiment of FIG. 3A in a fully inflated condition in a second deployed mode.
Figure 3D:
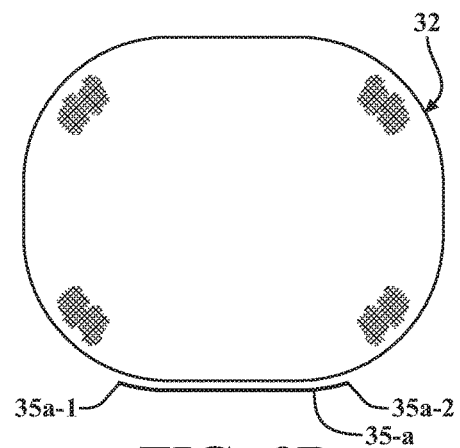
FIG. 3D is a schematic plan view of the airbag embodiment of FIG. 3C.

FIG. 3C is a schematic side view of the airbag 32 of FIGS. 3A and 3B, in a fully inflated condition. FIG. 3D is a plan view of the airbag shown in FIG. 3C. Here, the tethers 35a-35c have been heated prior to airbag deployment, to temperatures above the transformation temperature(s) of their constituent shape memory material(s), but within the superelastic temperature range(s) of the SMA material(s). Thus, the tethers 35a-35c may behave superelastically and may stretch responsive to forces exerted on the airbag by pressurized inflation gases. In FIG. 3D, it is seen that tether 35a attached to the airbag at locations 35a-1 and 35a-2 is stretched, so that the portion of the airbag positioned between the tether attachment locations is allowed to expand with the remainder of the airbag, to the inherent structural limits of the airbag. This may permit the airbag to inflate to the limits permitted by the structure of the airbag, as previously described. In addition, the tether dimensions and material and also the maximum value of the inflated dimension of the airbag controlled by the tether may be specified so that the tether is not stretched past a point where it will not return to its original unstretched length when heated to a temperature above the transformation temperature of the shape memory material and also above a superelastic temperature range of the material.

Figure 5A:
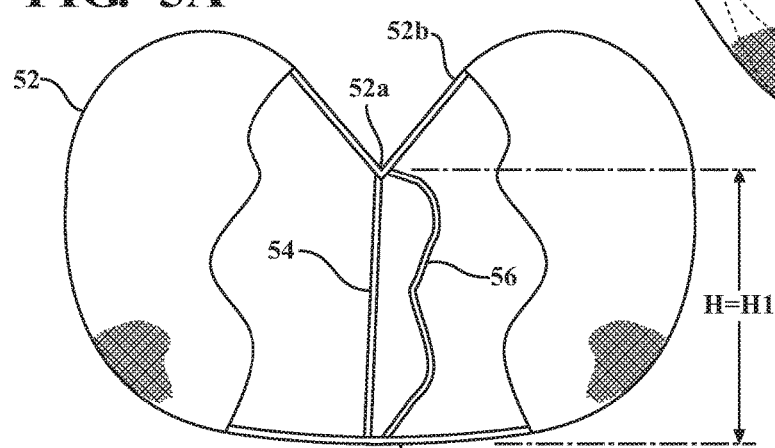
FIG. 5A is a schematic cross-sectional plan view of another airbag embodiment in a fully inflated condition in a first deployed mode.
Figure 5B:
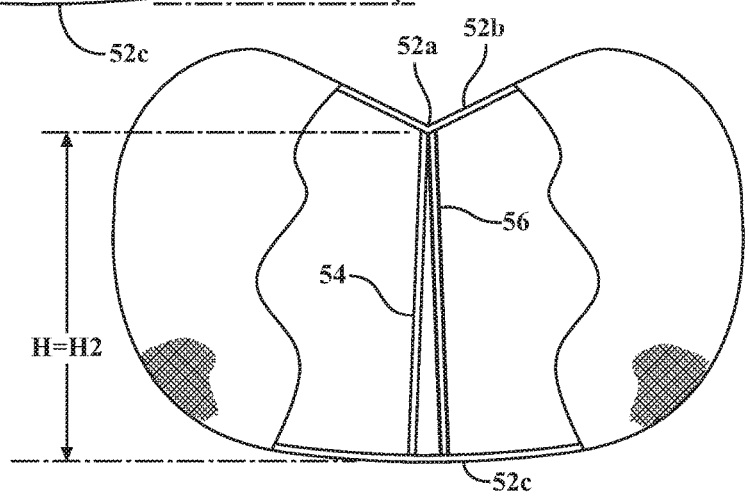
FIG. 5B is a schematic cross-sectional plan view of the airbag of FIG. 5A in a fully inflated condition in a second deployed mode.

FIGS. 5A-5B show operation of another possible arrangement of tethers coupled to an airbag so as to affect the inflated dimensions of the airbag when the tethers are heated. FIG. 5A is a schematic cross-sectional plan view of an inflated airbag 52 incorporating a first internal tether 54 and a second internal tether 56, operating in a first deployed mode. Both of tethers 54 and 56 may be coupled to a location 52a in the airbag 52. Location 52a may reside on an interior surface of a side 52b of the airbag which may be contacted by a vehicle occupant after deployment of the airbag. Tethers 54 and 56 may also be coupled to a side 52c of the airbag located opposite side 52b. The distance between the airbag sides 52b and 52c when the airbag is inflated in the first deployed mode may be given by the dimension H1. The tethers 54 and 56 may extend through the airbag interior to connect sides 52b and 52c. The tethers 54 and 56 may operate to restrict the inflated dimension H1 of the airbag.

First tether 54 may be an SMA tether (i.e., formed from a shape memory material). Second tether 56 may be formed from a metallic or other material not having shape memory characteristics, and may be longer than tether 54 when tether 54 is in an unstretched state. FIG. 5A shows an original, unstretched length of first tether 54. If the tether 54 has not been heated prior to airbag deployment, or if the tether was previously heated so as to shorten it to its normal, unstretched length, the tether 54 may be at its original, unstretched length and may operate to restrict the inflated dimension H to a value H1 when inflated. In this deployment mode, the dimension H is restricted to a first predetermined value H1 by the shorter-length tether 54.

FIG. 5B is a schematic cross-sectional plan view of the inflated airbag 52 operating in a second deployed mode. In FIG. 5B, the tether 54 is shown heated to a temperature above the transformation temperature of its constituent shape memory material, and also to a temperature within the superelastic temperature range of the material. Thus, during deployment and expansion of the airbag, airbag inflation forces act to stretch the tether 54 in its superelastic state, until the airbag inflated dimension H reaches a value H2, which is restricted and determined by the longer tether 56, and where H2>H1. Thus, the airbag inflates, the dimension H expands, and the SMA tether 54 stretches until dimension H is limited to a value of H2 by the non-SMA tether 56. In addition, the length of tether 56 may be specified in consideration of the superelastic properties of the tether 54 so that the tether 54 is not stretched superelastically past a point where it will not return to its original unstretched length when heated to a temperature above the transformation temperature of the shape memory material and also above a superelastic temperature range of the material.

Figure 4A:
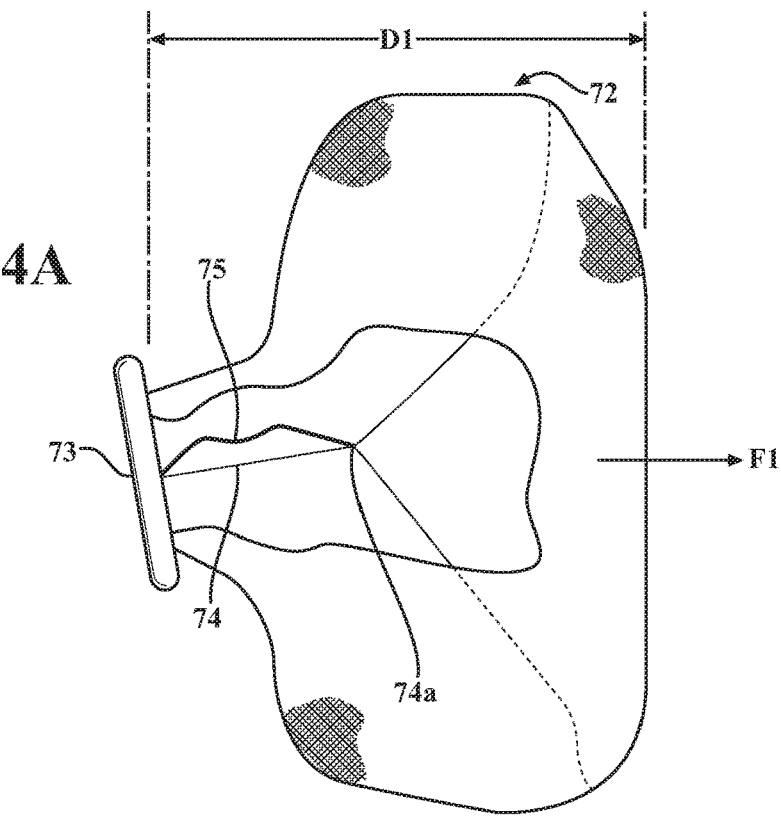
FIG. 4A is a schematic side view of another airbag embodiment in a fully inflated condition in a first deployed mode.
Figure 4B:
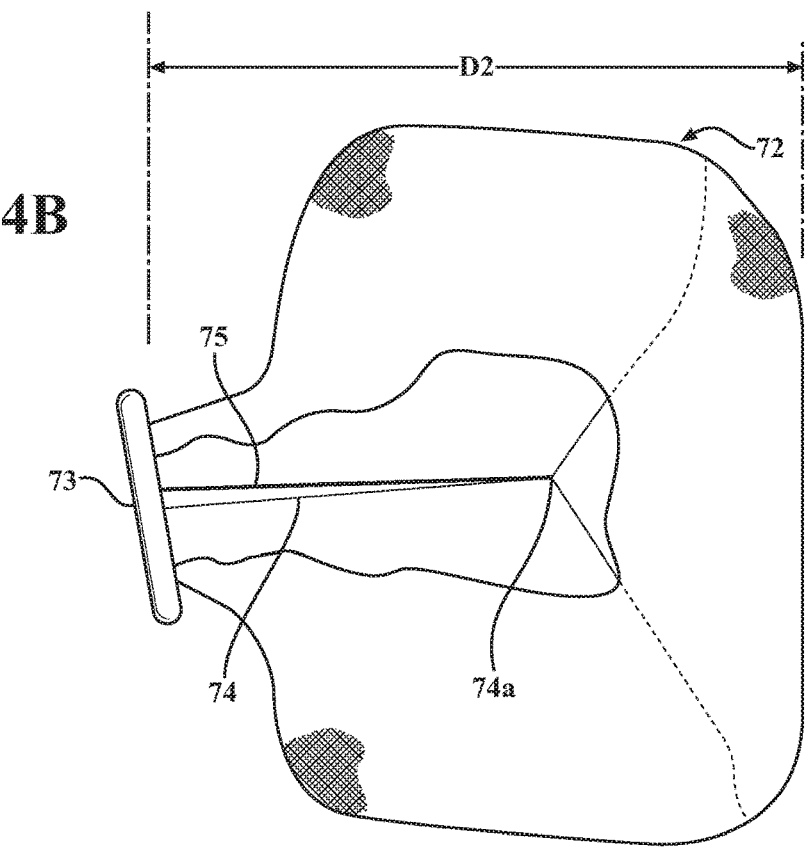
FIG. 4B is a schematic side view the airbag embodiment of FIG. 4A in a fully inflated condition in a second deployed mode.

FIGS. 4A-4B show operation of another possible arrangement of tethers coupled to an airbag so as to affect the inflated dimensions of the airbag when the tethers are heated. In this embodiment, an airbag 72 may deploy from a housing 73 (positioned, for example, in a steering wheel or a dashboard) in a direction F1, into the passenger compartment and toward a seated occupant (not shown).

Expansion or movement of the airbag 72 in direction F1 may be restricted by SMA tethers 74 and 76 (not shown) positioned on opposite sides of the exterior of the airbag and attached to the airbag at locations 74a and 76a (not shown). Expansion or movement of the airbag 72 in direction F1 may also be restricted by non-SMA tethers 75 and 77 (not shown) positioned on opposite sides of the exterior of the airbag, which are also attached to the airbag at locations 74a and 76a (not shown). Non-SMA tethers 75 and 77 may be longer than SMA tethers 74 and 76 when the SMA tethers are in their unstretched states.

The tethers 74-77 may operate on the same principles as previously described with respect to FIGS. 5A-5B. In FIG. 4A, when it is desired to restrict expansion or movement of the airbag 72 in direction F1, the tethers 74 and 76 may be left unheated (if previously unheated or unstretched) or may be heated to temperatures above the transformation temperature(s) of their constituent shape memory material(s), and also to temperatures above the superelastic temperature range(s) of the SMA material(s). This heating may cause stretched tethers 74 and 76 to contract to their unstretched lengths, thereby restricting expansion of the airbag 72 to the unstretched or shortened lengths of the SMA tethers 74 and 76, to the dimension D1.

In FIG. 4B, when it is desired to allow greater expansion or movement of the airbag 72 in direction F1, the SMA tethers 74 and 76 may be heated to temperatures above the transformation temperature(s) of their constituent shape memory material(s), and also within the superelastic temperature range(s) of the SMA material(s). In this mode, the tethers 74 and 76 may stretch superelastically until they reach the lengths of non-SMA tethers 75 and 77. Thus, the non-SMA tethers 75 and 77 effectively limit the movement of the airbag 72 in direction F1, to a dimension D2 where D2>D1. In addition, the lengths of SMA tethers 74 and 76 may be specified in consideration of the superelastic properties of the tethers so that the tethers 74 and 76 are not stretched superelastically past a point where they will not return to their original unstretched lengths when heated to temperatures above the transformation temperatures of their constituent shape memory materials and also above the superelastic temperature ranges of the materials.

Figure 6:
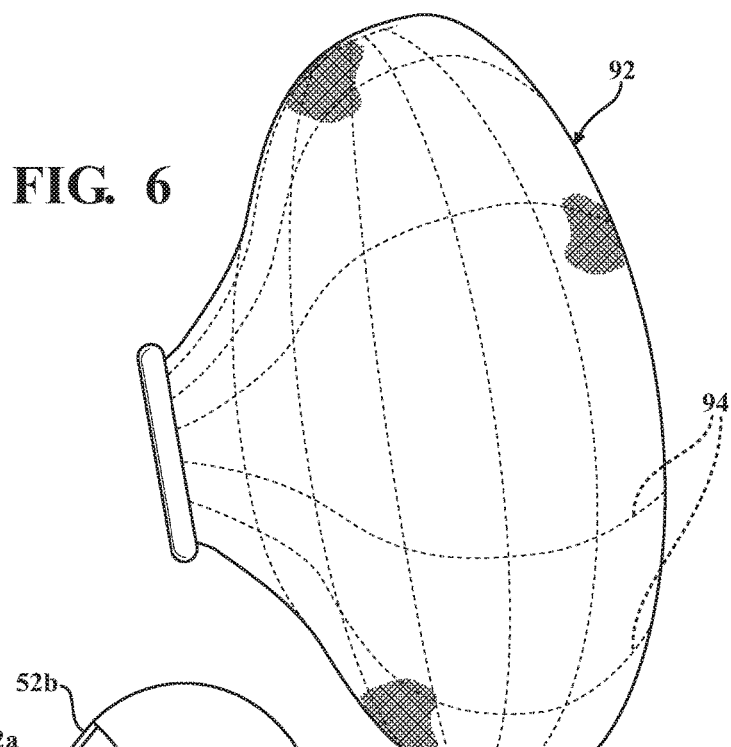
FIG. 6 is a schematic side view of another airbag embodiment in a fully inflated condition in a first deployed mode.

FIG. 6 is a schematic side view of another embodiment 92 of an airbag in which SMA tethers may be used to control one or more airbag dimensions. Airbag 92 is shown in a fully inflated state. In this embodiment, an airbag 92 has a series of tethers formed from one or more associated shape memory materials. The SMA tethers may be in the form of wires 94 embedded in the airbag fabric or attached to portions of the airbag fabric so as to provide and maintain a "net" or mesh structure wrapped around the airbag or a portion of the airbag. Control of the temperatures of the SMA tethers 94 as previously described may be used to affect the overall size of an envelope occupied by the inflated airbag 92. The SMA tethers 94 may be shortened to provide a relatively smaller overall airbag size. Alternatively, the tether temperature may be adjusted so as to permit superelastic expansion of the tethers 94 during airbag inflation, thereby providing a relatively larger overall airbag size.

Figure 7:
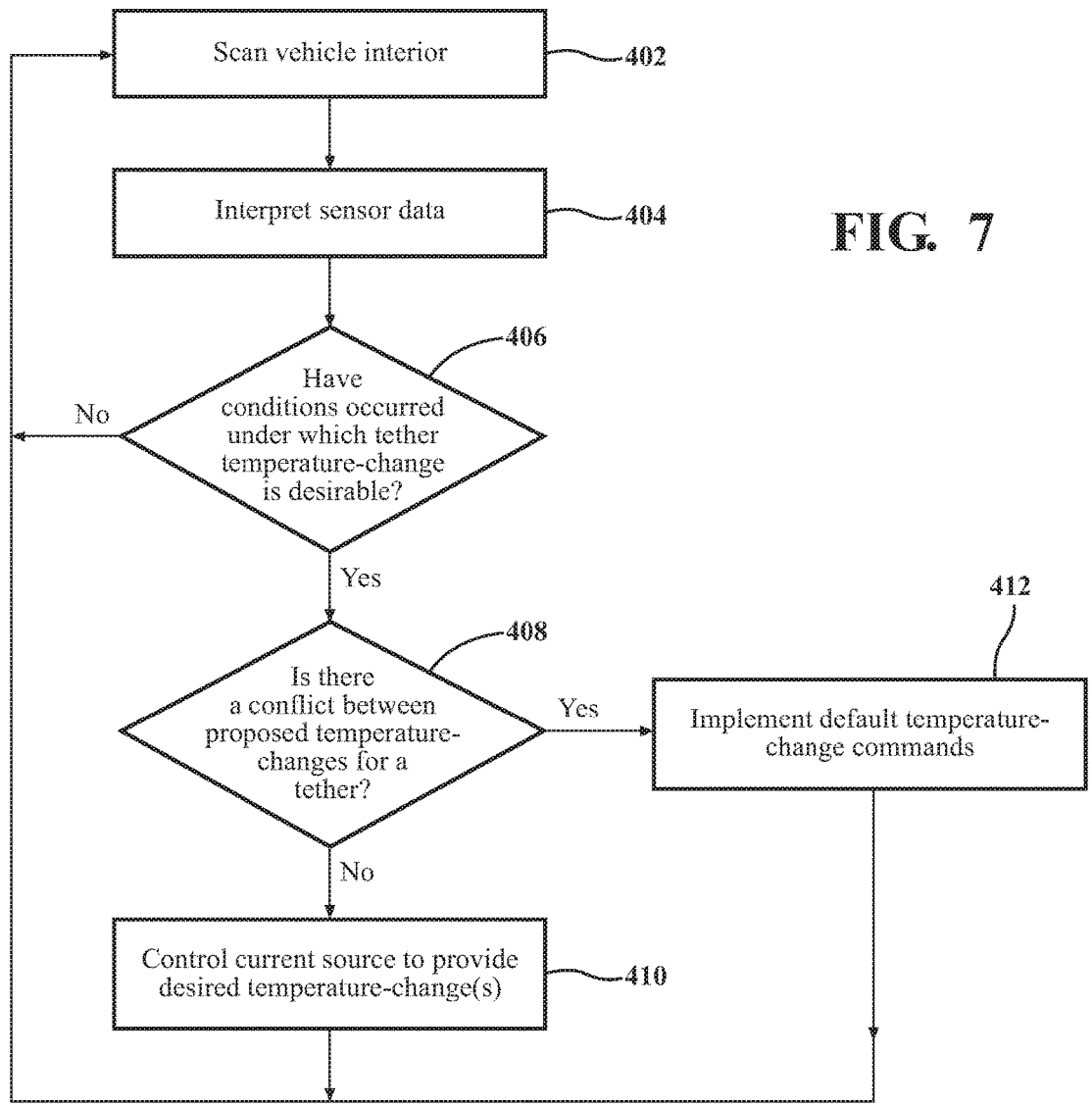
FIG. 7 is a schematic block diagram of a process flow for controlling the temperatures of SMA tethers in accordance with various occupant-related parameters.

FIG. 7 is a schematic block diagram of a process flow for controlling the temperatures of SMA tethers in accordance with various occupant-related parameters, such as occupant weight, position, etc., as previously described.

Referring to block 402, sensors of sensor system 124 may be configured to continuously scan or monitor the vehicle interior. The use of "continuously" when referring to the reception, gathering, monitoring, processing, and/or determination of any information or parameters (including vehicle occupant parameters) described herein means that the computing system 114 may be configured to receive and/or process any information relating to these parameters as soon as the information exists or is detected, or as soon as possible in accordance with sensor acquisition and processor processing cycles. For example, as previously described, the sensors system 124 may include one or more cameras 225 configured for monitoring aspects of the occupants' position and/or orientation relative to landmark locations or features in the vehicle interior, and for providing data used to determine occupant physical characteristics, such as height; weight sensors located in the vehicle seats to measure the weights of the occupants, and/or other types sensors.

Referring to block 404, computing system 114 may be configured to review and/or interpret sensor data to detect the occurrence of various conditions (or combinations of conditions) under which it may be desirable to change the temperatures of one or more SMA tethers, to either contract the tethers or allow the tethers to expand. For example, the computing system 114 may compare the values of various vehicle occupant parameters (such as weight) with threshold values, and may make a determination based on the results of the comparison. Alternatively, lookup tables containing conditional instructions may be stored in memory. Other tether temperature-change scenario determination methods and criteria may also be used.

Referring to block 406, if it determined that conditions exist under which changes in the temperatures of one or more tethers are desirable, the computing system may determine if the conditions give rise to any conflicts. For example, based on the weight of an occupant, it may be desirable to change the temperature of an SMA tether to contract the tether while, based on the position of the occupant, it may be desirable to change the temperature of an SMA tether so as to permit the tether to stretch.

Referring to block 408, if a combination of conditions occur such that a conflict exists between recommendations regarding how the temperature of any given SMA tether should be changed, the computing system may default to control commands directed to implementing a temperature-change scenario which produces a more conservative (i.e., safer) result. Such default commands may be determined prior to implementation of the adjustable airbag system and stored in a memory. Other default criteria and scenarios may also be used.

If there are no conflicts, the computing system 114 may (in block 410) control the current source to supply an individually tailored current to each SMA tether as needed, to heat each tether to an appropriate temperature. Since an amount of time will be required to change the temperature of a tether, the current flows to the tethers may be adjusted as soon possible (and so as to produce the desired effect as rapidly as possible) after the detection of a condition prompting a shift in the tether temperature, to help ensure that the SMA tethers will be at their desired temperatures if an airbag an associated is deployed. For example, if it is desirable to change the current temperature of a tether so as to cause the tether to contract, a suitable current may be supplied to the tether to increase the tether temperature to a temperature above the transformation temperatures of the constituent shape memory material, and also above the superelastic temperature range of the SMA material. After the tether has contracted, the current flow to the tether may be stopped.

A thermocouple or other suitable temperature sensing mechanism may be used to determine when the SMA tether has reached a desired temperature. The computing system 114 may be configured to assume that the SMA tether has achieved a desired state after a certain amount of time at the desired temperature. For example, the computing system may be configured to assume (based on previous analysis of and/or experimentation with) that the tether will have achieved an unstretched state after being at the required temperature for a predetermined amount of time (such as 10 seconds, for example).

If the tether is heated to a temperature within a superelastic range, the tether temperature may be maintained within this range until the need for superelastic behavior of the tether no longer exists. Thus, the computing system may control the current source to supply a constant or intermittent current to the tether sufficient to maintain the tether temperature within the superelastic range. The temperatures of the SMA tethers may be continuously monitored and controlled by the computing system 114 as described herein, according to changes in the occupant-related parameters. This helps to ensure that the SMA tethers affecting the airbag dimensions will be at the temperatures needed to produce the desired effects on the airbag dimensions if the airbags are deployed.

In the preceding detailed description, reference is made to the accompanying figures, which form a part hereof In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more non-transitory computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An adjustable airbag system for a vehicle, the system comprising:
   an inflatable airbag; and
   at least one tether formed from a shape memory material and having at least one portion thereof secured to the airbag, the at least one tether being structured to contract so as to control an inflated dimension of the airbag when the at least one tether is heated to a temperature above a transformation temperature of the shape memory material and also above a superelastic temperature range of the shape memory material, prior to airbag deployment,
   wherein the at least one tether is coupled to a first portion of the airbag and to a second portion of the airbag, and wherein the at least one tether extends through an interior of the airbag to connect the first portion with the second portion.

2. An adjustable airbag system for a vehicle, the system comprising:
   an inflatable airbag; and
   at least one tether formed from a shape memory material and having at least one portion thereof secured to the airbag, the at least one tether being structured to contract so as to control an inflated dimension of the airbag when the at least one tether is heated to a temperature above a transformation temperature of the shape memory material and also above a superelastic temperature range of the shape memory material, prior to airbag deployment,
   wherein the at least one tether is structured to stretch superelastically responsive to airbag inflation forces when the airbag is inflated while the at least one tether is at a temperature above the transformation temperature of the shape memory material and also within the superelastic temperature range of the shape memory material,
   wherein the airbag system further comprises at least one other tether having at least one portion thereof secured to the airbag, and wherein the airbag system is structured so that the inflated dimension of the airbag is controlled by the at least one other tether when the at least one tether is stretched superelastically by airbag inflation forces.

3. An adjustable airbag system for a vehicle, the system comprising:
   an inflatable airbag; and
   a plurality of tethers, each tether of the plurality of tethers having at least one portion thereof secured to the airbag, at least one tether of the plurality of tethers being formed from a shape memory material, wherein each tether of the plurality of tethers formed from a shape memory material is structured to contract so as to restrict an inflated dimension of the airbag when the tether formed from a shape memory material is heated to a temperature above a transformation temperature of the shape memory material and also above a superelastic temperature range of the shape memory material, prior to airbag deployment.

4. An adjustable airbag system for a vehicle, the system comprising:
   an inflatable airbag; and
   at least one tether formed from a shape memory material and having at least one portion thereof secured to the airbag, the at least one tether being structured to contract so as to control an inflated dimension of the airbag when the at least one tether is heated to a temperature above a transformation temperature of the shape memory material and also above a superelastic temperature range of the shape memory material, prior to airbag deployment,
   wherein the at least one tether is secured to a first location on the airbag, and wherein the airbag system further comprises at least one other tether having at least one portion thereof secured to the airbag.

5. The adjustable airbag system of claim 4 wherein the at least one other tether is formed from a shape memory material, and wherein the at least one other tether has at least one portion thereof secured to the airbag at a second location different from the first location.

6. The adjustable airbag system of claim 5 further comprising a current source configured to supply a separate current to each of the at least one tether and the at least one other tether, for heating the at least one tether and the at least one other tether.

7. The adjustable airbag system of claim 4 wherein the at least one other tether has at least one portion thereof secured to the first location on the airbag, and wherein the at least one other tether is structured to restrict an inflated dimension of the airbag when the at least one tether is heated to a temperature above the transformation temperature of the shape memory material of the at least one tether, and also within the superelastic temperature range of the material of the at least one tether.

8. The adjustable airbag system of claim 4 wherein the at least one portion of the at least one other tether is secured to the airbag at the first location, and wherein the at least one tether has at least one other portion secured to the airbag at a second location different from the first location.

9. An adjustable airbag system for a vehicle, the system comprising:
   an inflatable airbag; and
   a plurality of tethers, each tether of the plurality of tethers being formed from a shape memory material, each tether of the plurality of tethers being embedded in or attached to portions of the airbag so as to provide and maintain a mesh structure wrapped around at least a portion of the airbag, at least one tether of the plurality of tethers having at least one portion thereof secured to the airbag, the at least one tether of the plurality of tethers being structured to contract so as to control an inflated dimension of the airbag when the at least one tether of the plurality of tethers is heated to a temperature above a transformation temperature of the shape memory material of the at least one tether and also above a superelastic temperature range of the shape memory material, prior to airbag deployment.

10. An adjustable airbag system for a vehicle, the system comprising:

an inflatable airbag; and at least one tether having at least one portion thereof secured to the airbag, the at least one tether being formed from a shape memory material, the at least one tether being structured to restrict expansion of the airbag into a vehicle passenger compartment during deployment of the airbag when the at least one tether is heated to a temperature above a transformation temperature of the shape memory material and also above a superelastic temperature range of the shape memory material, prior to airbag deployment.

11. The adjustable airbag system of claim 10 wherein the at least one tether comprises a wire formed from a shape memory material.

12. The adjustable airbag system of claim 11 wherein the wire has a straight configuration.

13. The adjustable airbag system of claim 10 wherein the at least one tether extends along an exterior surface of the airbag.

14. The adjustable airbag system of claim 13 further comprising a cover positioned along the exterior surface of the airbag to cover the at least one tether.

15. The adjustable airbag system of claim 10 further comprising at least one other tether, wherein the at least one tether is structured to stretch superelastically responsive to airbag inflation forces when the airbag is inflated while the at least one tether is at a temperature above the transformation temperature of the shape memory material and also within the superelastic temperature range of the shape memory material prior to deployment of the airbag, and wherein the at least one other tether is structured to restrict expansion of the airbag into a vehicle passenger compartment during deployment of the airbag when the at least one tether stretches superelastically responsive to airbag inflation forces.

16. The adjustable airbag system of claim 15 wherein the at least one tether is structured to stretch superelastically responsive to airbag inflation forces when the airbag is inflated while the at least one tether is at a temperature above the transformation temperature of the shape memory material and also within the superelastic temperature range of the shape memory material.

17. The adjustable airbag system of claim 16 wherein the airbag system is structured so that the inflated dimension of the airbag is controlled by airbag panel size, shape, and/or stitching when the at least one tether is stretched superelastically by airbag inflation forces.

* * * * *